(12) United States Patent
Nickel et al.

(10) Patent No.: US 8,813,781 B2
(45) Date of Patent: Aug. 26, 2014

(54) DROP SEPARATOR

(75) Inventors: Waldemar Nickel, Lippstadt (DE);
Manfred Prueser, Rheinbach (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 65 days.

(21) Appl. No.: 13/521,191

(22) PCT Filed: Dec. 21, 2010

(86) PCT No.: PCT/EP2010/007820
§ 371 (c)(1),
(2), (4) Date: Jul. 9, 2012

(87) PCT Pub. No.: WO2011/082808
PCT Pub. Date: Jul. 14, 2011

(65) Prior Publication Data
US 2012/0305555 A1 Dec. 6, 2012

(30) Foreign Application Priority Data
Jan. 7, 2010 (DE) .......................... 10 2010 004 180

(51) Int. Cl.
*F02M 33/02* (2006.01)
*F02M 33/04* (2006.01)

(52) U.S. Cl.
USPC .......... 137/588; 137/171; 137/589; 220/86.2; 123/516; 123/518

(58) Field of Classification Search
USPC ......... 137/171, 173, 175, 197, 203, 204, 202, 137/587–589; 220/86.2; 141/44, 45, 59, 141/307; 123/516, 518
See application file for complete search history.

(56) References Cited

U.S. PATENT DOCUMENTS 403,704 A * 5/1889 Stuart ........................... 137/171
4,699,638 A * 10/1987 Harris .......................... 220/86.2
(Continued)

FOREIGN PATENT DOCUMENTS

DE 102006004630 A1 8/2007
DE 202008001586 U1 7/2008

OTHER PUBLICATIONS

International Search Report dated May 11, 2011 received in corresponding PCT Application No. PCT/EP2010/007820, 2 pgs (in the English language).

(Continued)

*Primary Examiner* — Craig Schneider
*Assistant Examiner* — Craig J Price
(74) *Attorney, Agent, or Firm* — Grossman Tucker Perreault & Pfleger, PLLC

(57) ABSTRACT

A drop separator for the bleeding line of a fuel container, comprising a drop separator housing that is connected to a space surrounded by the filler tube of the fuel container, preferably directly to the refueling channel of the filler tube, and at least two bleeding line connections, wherein the housing is divided by at least one partition into at least two separate gas paths, wherein a first gas path is designed as a gas inlet channel and a second gas path as a gas outlet channel. The gas inlet channel is closed on the end face by a lid and communicates via a passage of a surrounding wall of the drop separator housing with the filler tube.

15 Claims, 2 Drawing Sheets

(56) References Cited

U.S. PATENT DOCUMENTS

| | | | | |
|---|---|---|---|---|
| 4,706,708 | A | * | 11/1987 | Fornuto et al. ............... 137/588 |
| 5,137,002 | A | * | 8/1992 | Mahoney et al. ............. 123/516 |
| 5,579,742 | A | * | 12/1996 | Yamazaki et al. ............ 123/516 |
| 6,405,747 | B1 | * | 6/2002 | King et al. ................... 137/587 |
| 6,675,779 | B2 | * | 1/2004 | King et al. ................... 123/518 |
| 6,732,759 | B2 | * | 5/2004 | Romanek et al. ............ 137/588 |
| 7,694,665 | B2 | | 4/2010 | Ehrman et al. |
| 7,779,820 | B2 | * | 8/2010 | Rittershofer ................. 123/516 |
| 8,485,386 | B2 | * | 7/2013 | Koukan et al. ............... 220/562 |

OTHER PUBLICATIONS

PCT Translation of the International Preliminary Report on Patentability/Written Opinion issued Jul. 10, 2012, received in corresponding PCT Application No. PCT/EP2010/007820, 6 pgs (in English language).

English translation of Japanese Office Action mailed Jan. 14, 2014, received in related Japanese Patent Application No. 2012-546378, 3 pgs.

* cited by examiner

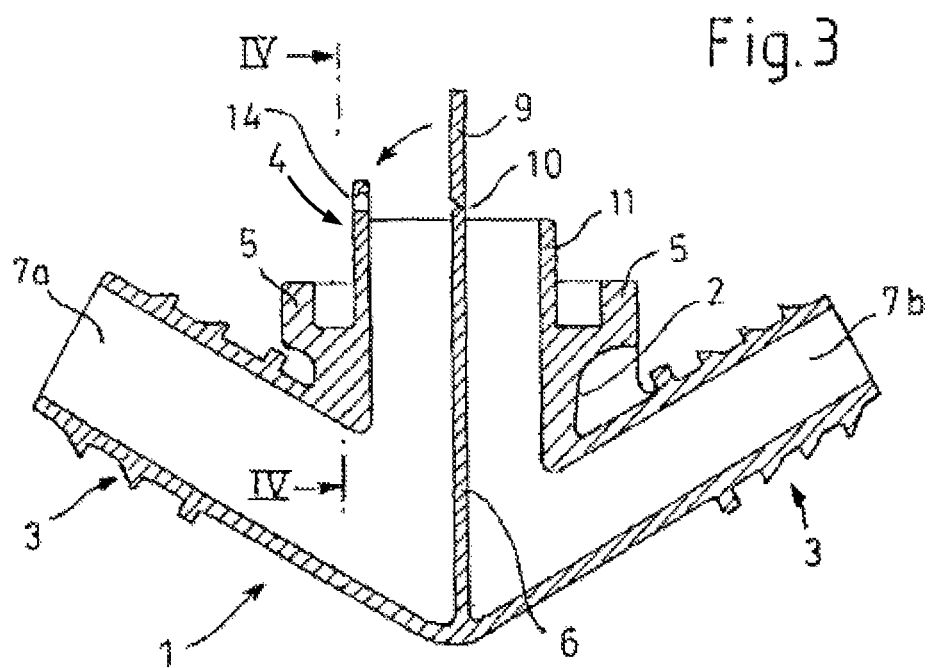
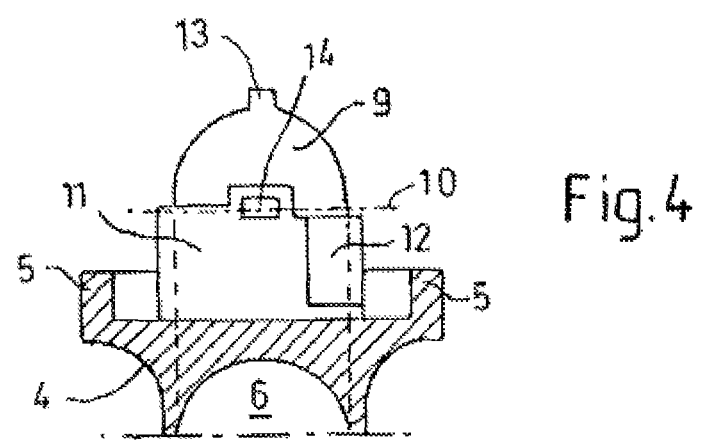

DROP SEPARATOR

The invention relates to a drop separator for the bleeding line of a fuel container.

Such a drop separator is known for example from DE 20 2008 001 586 U1. This utility model relates to a liquid vapor separator for a fuel system for a motor vehicle, wherein the liquid vapor separator comprises a housing having an inlet, which is connected to a venting system of the fuel tank, and having a vapor outlet, which is connected to a fuel vapor filter. The housing also comprises a condensation chamber for the condensation of fuel droplets, wherein this condensation chamber is attached to the filler neck of the fuel container or communicates therewith.

The incoming gas volume flow when bleeding the fuel container is normally fed via an activated carbon filter in the form of a fuel vapor filter. So as to ensure the functional efficiency of the fuel vapor filter or activated carbon filter, it is necessary to keep hydrocarbons in the liquid phase or in droplet form out of the fuel gas volume. These droplets entrained with the fuel gas volume flow are also referred to as "liquid carry-over". If liquid hydrocarbons reach the activated carbon filter, this blocks the adsorption pore volume and therefore leads to a reduction in the adsorption capacity of the fuel vapor filter.

It is therefore known to provide a drop separator in a bleeding line of the fuel container, said drop separator communicating with the filler tube so that separated "liquid carry-over" or the incoming liquid can be fed back into the fuel container. For example, this is implemented in the case of the drop separator according to DE 20 2008 001 586 U1 by attaching the drop separator housing to the filler tube in the region of the filler head thereof and by placing the condensation chamber of the drop separator in communication with the fuelling duct surrounded by the filler neck.

The bleeding line is expediently attached as close as possible to the filling end of the filler tube in the region of the "filler head". In this region, the filler tube is provided with an insert, which ensures the guidance of the nozzle, protection against refueling with the wrong type of fuel, and grounding of the filler tube. Inter alia, the "unleaded flap" is normally provided at this point as protection against refueling with the wrong type of fuel. The generally hot gases introduced from the bleeding line into the filler tube contact the opened unleaded flap during refueling and are subject to intense turbulence. The hot gases come into contact with the cold fuel jet. Due to the mixing of hot and cold gases in connection with hot pre-filling in the tank system and the feed of the cold fuel, gas expansion is caused together with a high level of condensate production. This can lead to unintentional shut-off of the nozzle.

The object of the invention is to provide a drop separator, which ensures introduction of the bleeding gas volume flow into the filler tube in a manner which is particularly favorable in terms of flow, and which also can be produced relatively easily. In addition, the drop separator according to the invention is to be of particularly simple design.

The object on which the invention is based is achieved by a drop separator for the bleeding line of a fuel container, having a drop separator housing, which is attached to a chamber surrounded by a filler tube of the fuel container, preferably is directly attached to the refueling duct of the filler tube, with at least two bleeding line connectors, wherein the housing is divided into at least two separate gas paths by means of at least one partition wall, wherein a first gas path is formed as a gas entry duct and a second gas path is formed as a gas discharge duct, the gas entry duct is closed at the end by means of a cover or the like, and communicates with the filler tube via an aperture in an enclosing wall of the drop separator housing.

The invention can largely be summarized as follows: In a drop separator which is provided in the bleeding line of a bleeding system of a fuel container, which is attached externally to the refueling duct of the filler tube in such a way that the filler tube itself forms part of the bleeding path, the part of the gas entry duct opening into the filler tube, that is to say the part of the bleeding path from the fuel container into the filler tube, is closed at the end, such that, when refueling the fuel container, the bleeding volume flow entering into the filler tube does not directly contact the fuel jet from the nozzle introduced into the filler tube. Rather, this bleeding volume flow is deflected so that a high level of condensate formation in the mouth region of the nozzle is prevented.

It has surprisingly already been found that such a relatively simple measure can prevent increased condensate production in the region of the filler tube in which the nozzle is inserted during refueling. Any unintentional shut-offs of the nozzle can thus be effectively avoided. It is known to provide nozzles with a balancing bore, to which a vacuum is applied and which, when the pressure increases, leads directly to shut-off of the nozzle, for example because liquid fuel has reached the balancing bore.

In a particularly advantageous variant of the drop separator according to the invention, the cover is formed as part of the partition wall. In particular, it is thus possible to produce the drop separator according to the invention particularly easily using relatively simple injection-molding tools. For example, the cover can be hinged to the partition wall via a living hinge so that, by being turned, it can be brought into its position closing the end of the gas entry duct before assembly of the drop separator in the filler tube. In particular, such a design has the advantage that the drop separator according to the invention can be produced in one part overall in an injection-molding method using relatively simple tools.

The cover is expediently fixed in a latched manner in the position closing the gas entry duct. To this end, it may be provided for example with one or more latching protrusions and/or latching openings on its periphery, said protrusions and/or openings being able to cooperate with corresponding latching protrusions and/or latching openings of the enclosing wall of the drop separator housing or of a connection piece provided on the drop separator housing.

In a preferred variant of the drop separator according to the invention, the drop separator housing has a welding flange for connection to the filler tube of the fuel container.

The drop separator housing preferably comprises at least one mouth connection piece, the enclosing wall of which surrounds the gas entry duct and the gas discharge duct in part. This mouth connection piece can penetrate a corresponding opening in the filler tube or in the outer wall of a filler tube or of a collection chamber arranged upstream of the filler tube.

The mouth connection piece expediently protrudes beyond the assembly plane of the drop separator housing defined by the welding flange so that the mouth connection piece dips into the filler tube of the fuel container when the drop separator is installed.

The invention further relates to a fuel container for a motor vehicle, comprising at least one filler tube having at least one bleeding system, with at least one bleeding line to a fuel vapor filter, wherein the bleeding system comprises at least one drop separator, and wherein the drop separator is attached directly to the refueling duct of the filler tube.

The drop separator or the drop separator housing is expediently welded tightly to an outer wall of the filler tube via a welding flange and, by means of a pipe connection piece formed as a mouth connection piece, penetrates an aperture in the outer wall of the filler tube or an aperture in the outer wall of a gas collection chamber attached to the filler tube.

The invention will be explained hereinafter on the basis of an exemplary embodiment illustrated in the drawings, in which:

FIG. 3 shows a sectional view through a drop separator according to the invention in the unassembled position; and FIG. 4 shows a sectional view along the line IV-IV in FIG. 3.

Figure 1:
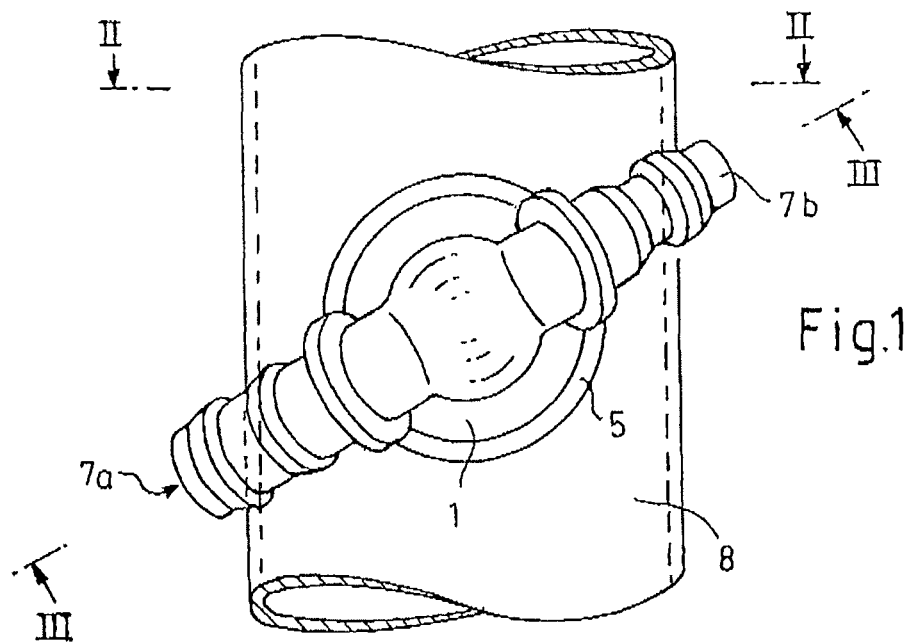
FIG. 1 shows an external view of the filler tube of a fuel container according to the invention.

The drop separator 1 according to the invention comprises a drop separator housing 2 with two bleeding line connectors 3, which are formed in the illustrated exemplary embodiment as nipples having a fir-tree profile. The drop separator housing 2 basically comprises a cylindrical pipe connection piece 4 having a peripheral welding collar 5 for welding to the filler tube 8 of a plastics fuel container. The fuel container, of which only the filler tube 8 is illustrated for reasons of simplicity, consists in a known manner of a multi-layered thermoplastic polymer based on HDPE having at least one barrier layer to hydrocarbons.

The drop separator 1 according to the invention is likewise formed of thermoplastic polymer, preferably of a polymer which is compatible with the filler tube 8 in terms of weldability. For example, the drop separator is formed as an injection-molded component.

The bleeding line connectors 3 provided on the drop separator housing 2 are each attached to the bleeding line (not illustrated) of a bleeding system of a fuel container when the drop separator 1 is installed. For example, both refueling valves and operational bleeding valves may be provided on the container side and are attached to the drop separator 1 via a collection bleeding line.

The drop separator 1 according to the invention defines a first gas path 7a from the aforementioned collection bleeding line into the filler tube 8 and a second gas path 7b from the filler tube 8 to a fuel vapor filter (not illustrated).

Figure 2:
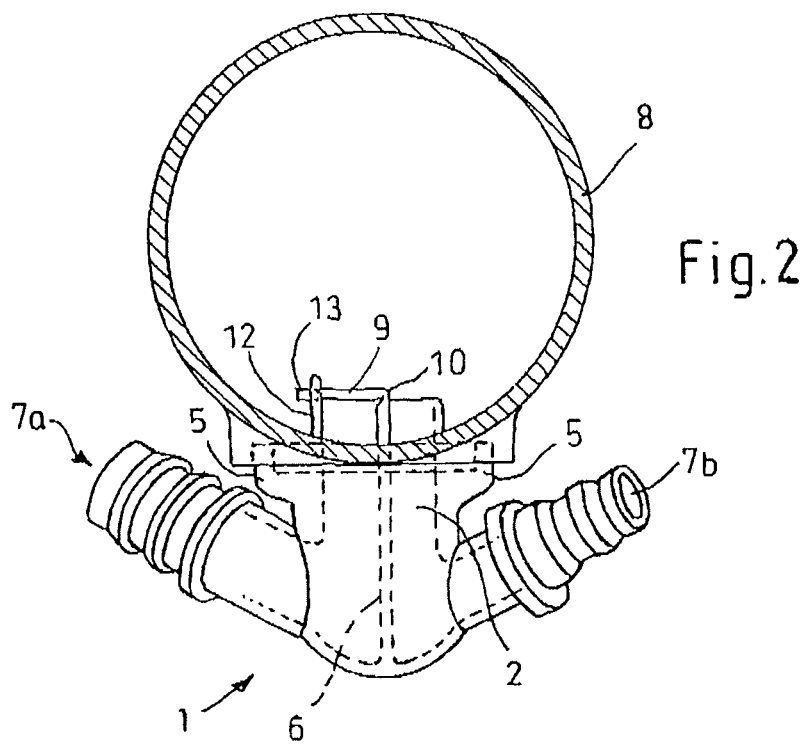
FIG. 2 shows a sectional view along the line II-II in FIG. 1.

As can be seen in particular from FIG. 2, the drop separator housing 2 is attached to the filler tube 8 of the fuel container in such a way that the cylindrical pipe connection piece 4 provided thereon penetrates an aperture in the filler tube 8 and dips into the filler tube 8. The drop separator housing 2 is welded tightly to the filler tube 8 in the region of the peripheral welding collar 5. The first and second gas paths are separated within the drop separator housing 2 via a partition wall 6 extending in the drop separator housing 2. The first gas path 7a forms a gas entry duct, which is attached to the collection bleeding line of the fuel container, whereas the second gas path 7b forms a gas discharge duct which is attached to the fuel vapor filter of the fuel container. For example, this fuel vapor filter can be formed as an activated carbon filter, which is known per se.

The pipe connection piece 4 of the drop separator 1 is inserted into the aperture in the filler tube 8, which can be formed for example as a discharge, such that the pipe connection piece 4 protrudes beyond or dips into the refueling tank surrounded by the filler tube 8.

The partition wall 6 is closed by means of a cover 9, which is formed as an extension of the partition wall 6 and is hinged to the partition wall by means of a living hinge 10.

As shown in FIG. 2, the cover 9 closes the end opening of the first gas path 7a when installed. A window 12, through which the bleeding gas volume flow reaches the chamber, surrounded by the filler tube 8, or the refueling duct, is provided as an aperture in an enclosing wall 11 of the pipe connection piece 4. The gas volume flow is effectively deflected by 90° by the cover 9 so that the bleeding gas volume flow is prevented from contacting a closure flap in the filler tube 8 arranged in this region.

FIGS. 3 and 4 show the drop separator 1 according to the invention in a position not assembled on the filler tube 8, wherein the cover 9 is illustrated in the position not closing the gas entry duct 7a.

Within the context of the invention, the expressions "gas entry duct" and "gas discharge duct" refer to the gas flow with respect to the filler tube 8. The first gas path 7a is thus used to introduce the incoming refueling or operational bleeding volume flow into the filler tube 8, whereas the second gas path 7b is used to guide the refueling and/or operational bleeding volume flow out of the filler tube or out of the refueling duct surrounded by the filler tube 8 and towards the fuel vapor filter. In particular when refueling the motor vehicle, the volume surrounded by the filler tube 8 in the region of the drop separator 1 is used as a collection chamber for liquid hydrocarbon particles entrained during the refueling bleed.

FIGS. 3 and 4 show the drop separator 1 according to the invention in a position of non-use, for example in the position in which it has been removed from an injection-molding tool. The cover 9 is moved or the cover 9 is folded into the position shown in FIG. 2 along the line defined by the living hinge 10 before it is assembled in the filler tube 8. To this end, the cover 9 is provided with a latching protrusion 13, which snaps into or engages with a latching recess 14 in the enclosing wall 11 of the pipe connection piece 14 in the end position.

LIST OF REFERENCE SIGNS 1 drop separator
2 drop separator housing
3 bleeding line connectors
4 pipe connection piece
5 welding collar
6 partition wall
7a, 7b first and second gas path
8 filler tube
9 cover
10 living hinge
11 enclosing wall
12 window
13 latching protrusion
14 latching recess

What is claimed is:

1. A drop separator for a bleeding line of a fuel container, comprising:
  a drop separator housing, which is attached to a chamber surrounded by a filler tube of the fuel container, with at least two bleeding line connectors, wherein the housing is divided into at least two separate gas paths by at least one partition wall, wherein a first gas path is formed as a gas entry duct and a second gas path is formed as a gas discharge duct, the gas entry duct is closed at an end by means of a cover, and communicates with the filler tube via an aperture in an enclosing wall of the drop separator housing, and
  wherein the cover is formed as an extension of the partition wall, which is hinged to the partition wall via a living hinge.

2. The drop separator as claimed in claim 1, wherein the cover is formed as part of the partition wall.

3. The drop separator as claimed in claim 1, wherein the cover is fixed in a latched manner in a position closing the gas entry duct.

4. The drop separator as claimed in claim 1, wherein the drop separator housing has a welding flange for connection to the filler tube of the fuel container.

5. The drop separator as claimed in claim 1, wherein the drop separator housing comprises at least one mouth connection piece, the enclosing wall of which surrounds the gas entry duct and the gas discharge duct in part.

6. The drop separator as claimed in claim 5, wherein the mouth connection piece protrudes beyond a plane defined by a welding flange so that the mouth connection piece dips into the filler tube when the drop separator is installed.

7. The drop separator as claimed in claim 1, wherein the drop separator is attached directly to a refueling duct of the filler tube, wherein the fuel container is for a motor vehicle, wherein the filler tube comprises at least one bleeding system with at least one bleeding line to a fuel vapor filter, and wherein the drop separator is a component of the bleeding system.

8. The drop separator as claimed in claim 7, wherein the drop separator housing is welded to an outer wall of the filler tube via a welding flange and, by a pipe connection piece formed as a mouth connection piece, penetrates an aperture in the outer wall of the filler tube.

9. The drop separator as claimed in claim 1, wherein the drop separator is attached directly to a refueling duct of the filler tube,
wherein the fuel container is a fuel container is for a motor vehicle,
wherein the filler tube comprises at least one bleeding system with at least one bleeding line to a fuel vapor filter, and
wherein the drop separator is a component of the bleeding system.

10. The drop separator as claimed in claim 9, wherein the drop separator housing is welded to an outer wall of the filler tube via a welding flange and, by a pipe connection piece formed as a mouth connection piece, penetrates an aperture in the outer wall of the filler tube.

11. A drop separator for a bleeding line of a fuel container, comprising:
a drop separator housing, which is attached to a chamber surrounded by a filler tube of the fuel container, with at least two bleeding line connectors, wherein the housing is divided into at least two separate gas paths by at least one partition wall, wherein a first gas path is formed as a gas entry duct and a second gas path is formed as a gas discharge duct, the gas entry duct is closed at an end by a cover, and fluidly communicates with the filler tube via an aperture in an enclosing wall of the drop separator housing,
wherein the drop separator housing comprises at least one mouth connection piece, the enclosing wall of which surrounds the gas entry duct and the gas discharge duct in part, and
wherein the mouth connection piece protrudes beyond a plane defined by a welding flange so that the mouth connection piece dips into the filler tube when the drop separator is installed.

12. The drop separator as claimed in claim 11, wherein the cover is formed as part of the partition wall.

13. The drop separator as claimed in claim 11, wherein the cover is formed as an extension of the partition wall, which is hinged to the partition wall via a living hinge.

14. The drop separator as claimed in claim 13, wherein the cover is fixed in a latched manner in a position closing the gas entry duct.

15. The drop separator as claimed in claim 11, wherein the drop separator housing has a welding flange for connection to the filler tube of the fuel container.

* * * * *

UNITED STATES PATENT AND TRADEMARK OFFICE
CERTIFICATE OF CORRECTION

| | |
|---|---|
| PATENT NO. | : 8,813,781 B2 |
| APPLICATION NO. | : 13/521191 |
| DATED | : August 26, 2014 |
| INVENTOR(S) | : Nickel et al. |

Page 1 of 1

It is certified that error appears in the above-identified patent and that said Letters Patent is hereby corrected as shown below:

In the Claims

In column 4, line 59, in claim 1, delete "by means of" and insert -- by --, therefor.

In column 5, line 31, in claim 9, delete "the fuel container is a fuel container is for" and insert -- the fuel container is for --, therefor.

Signed and Sealed this
Sixth Day of January, 2015

Michelle K. Lee
*Deputy Director of the United States Patent and Trademark Office*